United States Patent [19]
Cavasa et al.

[11] Patent Number: 4,686,825
[45] Date of Patent: Aug. 18, 1987

[54] SYSTEM FOR SUPPLYING FUEL TO AN AIRCRAFT ENGINE

[75] Inventors: Victor Cavasa, Pibrac; Jean-Marc Fontaine, Ramonville, both of France

[73] Assignee: Aerospatiale Societe Nationale Industrielle, Paris, France

[21] Appl. No.: 839,545

[22] Filed: Mar. 14, 1986

[30] Foreign Application Priority Data

Apr. 3, 1985 [FR] France ................. 85 05077

[51] Int. Cl.[4] .............................................. F02C 9/28
[52] U.S. Cl. ................................... 60/243; 60/39.281
[58] Field of Search ............... 60/228, 243, 39.281; 364/431.02

[56] References Cited

U.S. PATENT DOCUMENTS

| | | | |
|---|---|---|---|
| 3,854,287 | 12/1974 | Rembold | 60/243 |
| 4,248,042 | 2/1981 | Larsen et al. | 60/243 |
| 4,258,545 | 3/1981 | Slater | 60/243 |
| 4,314,445 | 2/1982 | Lewis | 60/243 |
| 4,468,924 | 9/1984 | Moore | 60/39.281 |
| 4,551,972 | 11/1985 | Lewis | 60/39.281 |

*Primary Examiner*—Louis J. Casaregola
*Attorney, Agent, or Firm*—Fisher, Christen & Sabol

[57] ABSTRACT

This invention relates to a system for supplying fuel to an aircraft engine, wherein an electronic computer subdivides the stroke of the throttle lever into a plurality of zones, in each of which the thrust of the engine varies between a maximum value and a minimum value. The computer ensures a modulation of the thrust about the value corresponding to that displayed by the position of said throttle lever. No mechanical link is provided between the lever and the fuel admission valve.

16 Claims, 6 Drawing Figures

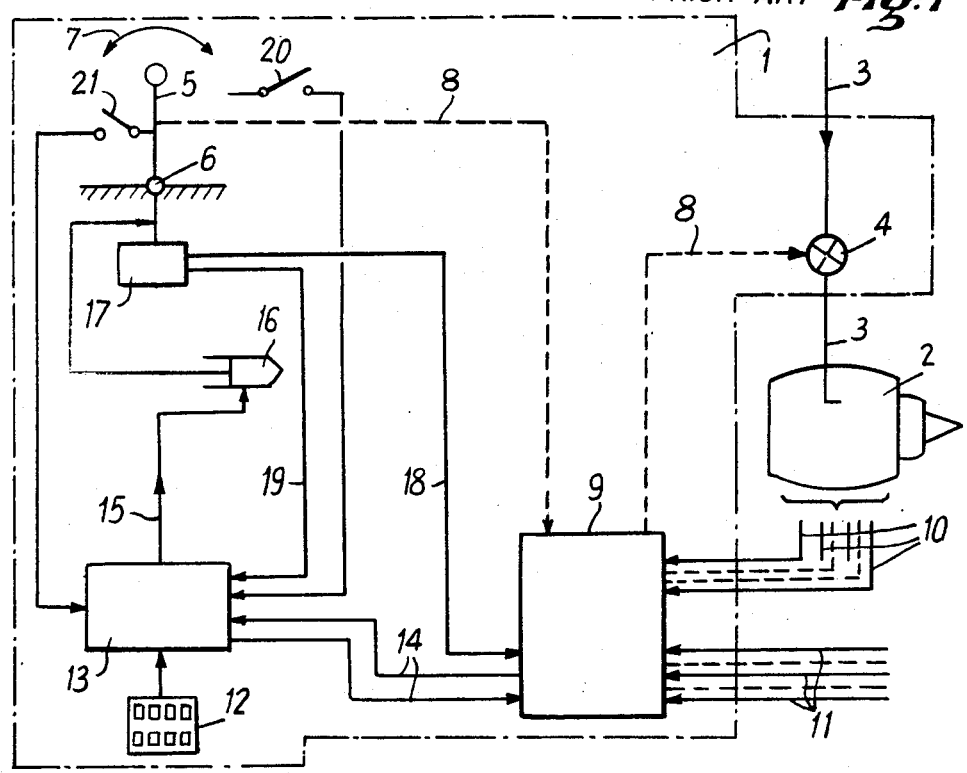
PRIOR ART Fig. 1
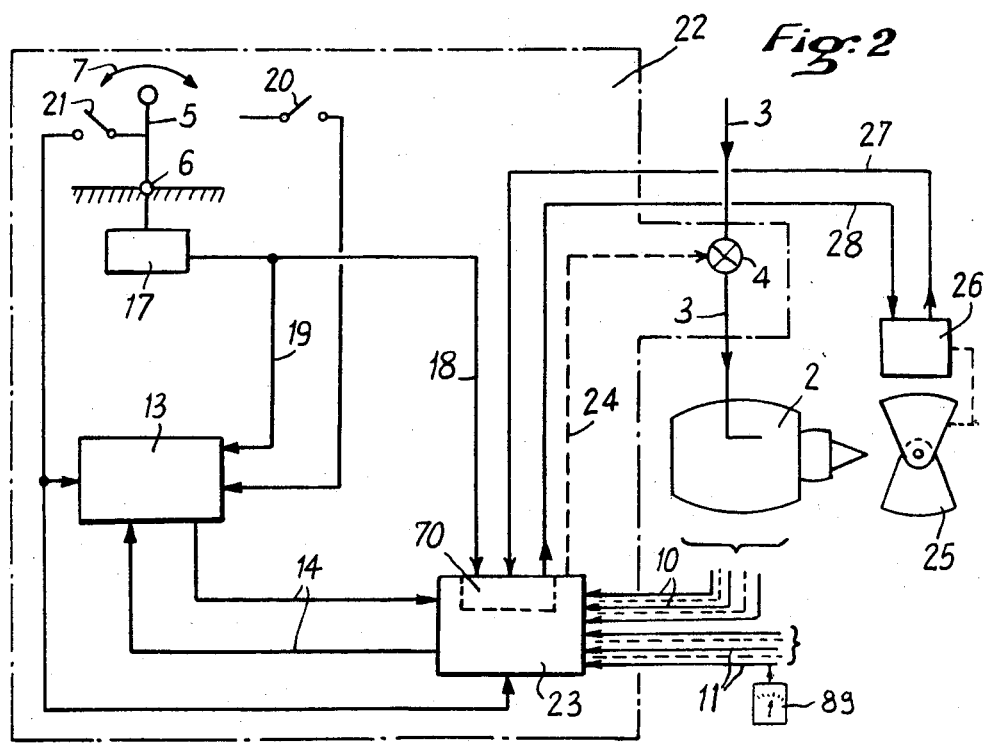
Fig. 2

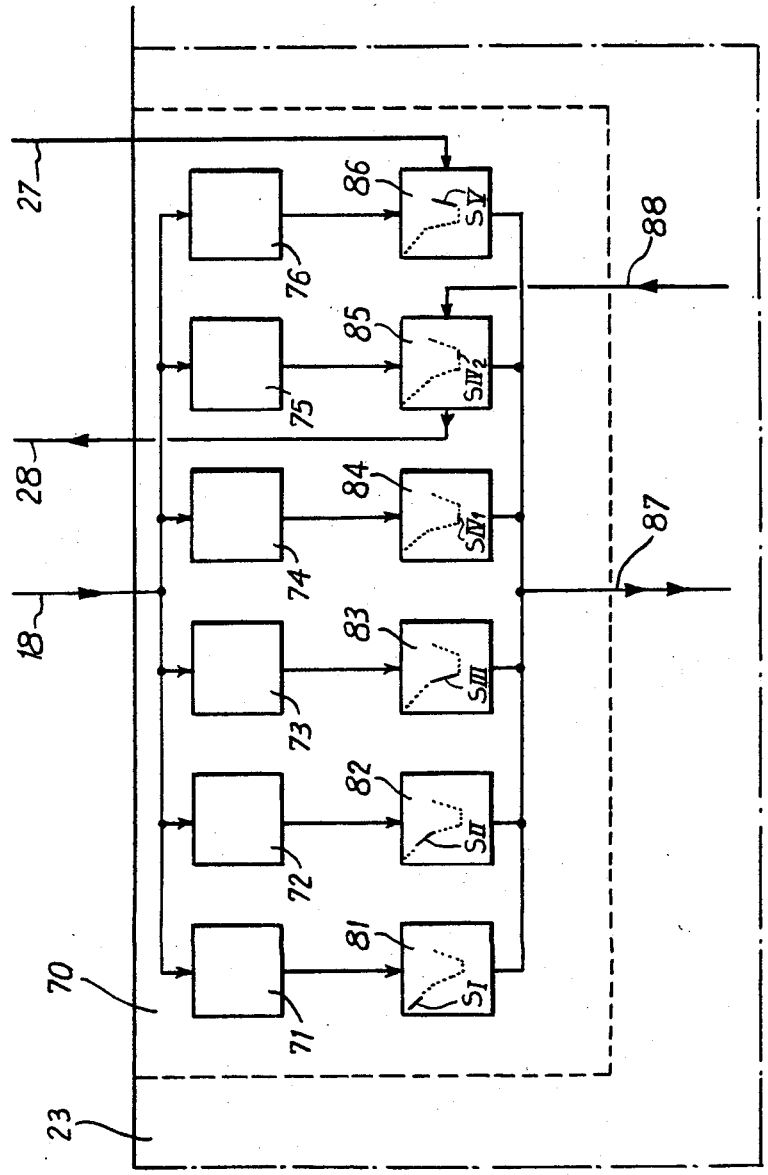

SYSTEM FOR SUPPLYING FUEL TO AN AIRCRAFT ENGINE

The present invention relates to a system for supplying fuel to an aircraft engine.

It is known that, in order to control the thrust exerted by an aircraft engine and/or the speed of said aircraft, the opening of a controlled valve, disposed in the fuel supply duct of said engine, is monitored so as to control the flowrate of fuel admitted into said engine. In order to actuate such a valve, a throttle lever is provided, disposed laterally with respect to the pilot (and/or the copilot) of the aircraft and separate from the control column. This throttle lever is articulated about a horizontal axis, transverse to the aircraft, so as to be able to pivot from the front of the aircraft towards the rear thereof and vice-versa. A position of the lever towards the front generally corresponds to a higher engine speed than a position of the lever towards the rear, with the result that the pilot pushes the throttle lever forwards with respect to the aircraft in order to increase the engine speed and pulls this lever rearwardly with respect to said aircraft in order to reduce this speed.

To ensure that one position of said controlled valve corresponds to one position of said throttle lever, a transmission between these two members is provided. In the known systems, such a transmission is essentially mechanical and is constituted by a linkage. However, in order to avoid possible deteriorations of the engine, for example due to overstressing or excessive heating, there are provided, in said transmission, means for correcting the control of gas by the throttle. These correction means are essentially constituted by a regulator, for example of the hydromechanical and/or electrical type, interposed in the linkage connecting the throttle lever to the valve. In the particular case of said regulator being electrical, totally or partially, a resolver is provided, associated with said throttle lever and capable of delivering a signal indicative of the position of the latter.

In order to perform its function, said regulator receives from a plurality of sensors both internal parameters of the engine (temperatures, pressures, speed of rotation of the or each rotor, etc. . . ), and parameters concerning the environment of the aircraft (temperatures, pressures, altitude, speed of the surrounding air, relative speed of the aircraft with respect to the air, accelerations of the aircraft, etc. . .).

It will be noted that said correction means, being of the regulator type, may protect the engine efficiently by reducing, the speed when necessary, but, on the other hand, that they cannot increase the speed of the engine, for example to maintain the thrust thereof in order to overcome a momentary aerodynamic overload imposed on the aircraft by its environment. In such a situation, the pilot is therefore obliged to let go of the control column with one hand to actuate the throttle lever with this hand and re-establish the desired thrust for the engine. The pilot therefore holds the column only with one hand, just when an outside disturbance might require the concentration of all his efforts on the control of said column.

In order partly to remedy this drawback in manual operation described hereinabove, the known systems comprise an electronic automatic thrust. adjusting device adapted to be actuated at cruising speed. This device receives at least certain of said internal and external parameters of the engine, as well as the signal from the resolver associated with said throttle lever, and delivers a signal indicating a reference thrust. This device further receives information on the maximum thrust limit not to be overstepped, via a selector arranged at the disposal of the crew and making it possible, depending on the circumstances, to select between several maximum thrust limit values.

In the known systems, a motorization device is also provided, coupled with said throttle valve and controlled by the signal delivered by the electronic automatic thrust-adjusting device. In this way, as a function of this latter signal, the motorization device displaces said throttle lever which, in turn, via the linkage and the regulator, actuates said controlled valve.

The known systems for supplying fuel to an aircraft engine are thus seen to present numerous drawbacks:

(a) In manual operational mode, for each position of the throttle lever, they can only limit the engine speed and are incapable of increasing this speed, for example in order to maintain the thrust constant;

(b) Automatic operational mode, which intervenes only at cruising speed, requires a motorization device for the throttle lever;

(c) In automatic operational mode, the throttle lever is constantly in motion under the action of said motorization device;

(d) They necessitate a selector of maximum thrust limit values, separate from the throttle lever, with the result that the workload of the crew is relatively heavy and the definition of the control members of the engine installed in the pilot's cabin is complex;

(e) Upon take-off, in manual operational mode, the position of the throttle lever is not always the same, since the thrust to be exerted upon take-off is a function of the load of the aircraft and, consequently, this position depends on said load: the workload of the crew is therefore increased since the correct position must be determined upon every take-off.

BROAD DESCRIPTION OF THE INVENTION

It is an object of the present invention to overcome these drawbacks. It relates to a system for supplying fuel to an aircraft engine, whose structure is very different from that of known systems and which allows:

(1) In manual operational mode, for each position of the throttle lever, a certain automatic variation of the thrust, in the sense both of increase and of decrease, within a predetermined range;

(2) The elimination of the motorization device of the throttle lever;

(3) The steadiness of the position of the throttle lever both in automatic operational mode and in manual operational mode;

(4) The elimination of a selector of maximum thrust limit values, separate from the throttle lever;

(5) The uniqueness of the position of the throttle lever upon take-off, whatever the load of the aircraft.

To these ends, according to the invention, the system for supplying fuel to an aircraft engine, includes: a controlled valve, controlling the flow rate of fuel admitted into the engine; and a throttle lever, mobile in two opposite directions along a stroke defined by two end positions. The lever is associated with a resolver capable of delivering a continuous signal indicative of the postion of the lever. There is a transmission arranged between the throttle lever and the controlled valve, to cause one position of said valve to correspond to one position of the lever. The transmission includes a correction device which, on the one hand, receives a plurality of parameters concerning both the operation of the engine and the environment of the aircraft, as well as the signal from the resolver, and, on the other hand, is capable of correcting the control of the valve by the lever to take into account the parameters. There is also an electronic thrust-adjusting device receiving at least certain of the parameters and the signal from the resolver, and delivering a signal indicative of a reference thrust. The system further includes switching means enabling the controlled valve to be controlled:

either by voluntary manual actuation of said throttle lever, or at least at cruising speed of the aircraft, automatically via the electronic thrust-adjusting device.

In the invention system, the correction device is entirely electrical and controls the valve via its output signal. The electrical connection between the resolver and the correction device is the sole link between the throttle lever and the correction device. The said correction device includes:

(a) first means for subdividing the signal from the resolver into a plurality of consecutive portions: and (b) second means for converting each of said portions of signal from the resolver into an elementary valve-control signal, which is characteristic of a control phase of the aircraft and whose ends, except possibly for that elementary valve-control signal which corresponds to idling of the engine, constitute, one, the maximum value and the other, the minimum value of said corresponding elementary signal. The output signal of said correction device is constituted by the juxtaposition of the elementary valve-control signals with the result that:

on the one hand, there is established mathematical function which ensures that a thrust for the motor corresponds to each position of the throttle lever; and on the other hand, the stroke of said throttle lever is subdivided into a plurality of consecutive zones of which each is associated with a control phase, and corresponds to a thrust range for the engine, the ends of each zone corresponding, one, to the maximum value and the other, to the minimum value of the thrust in the corresponding range. There is also (c) third means which, when the electronic thrust-adjusting device is switched off by action of the switching means, and when the throttle lever lies within such a zone and as a function of the parameters, automatically cause the thrust of vary within the corresponding range, the variation in thrust being effected, from the value corresponding to the position of the throttle lever, both towards the maximum value and towards the minimum value of the range. The maximum and minimum values constituting limits not to be overstepped.

It is thus seen that, thanks to the system according to the invention, the motorization of the throttle lever has been eliminated and that, consequently, this lever remains in fixed position, even in automatic operational mode when it is under the orders of the electronic thrust-adjusting device.

In manual operational mode, the pilot selects a zone of the stroke of the throttle lever and guides the latter thereto. This results in the display of a thrust for the engine. If, for reasons internal or external to the engine, this thrust undergoes an increase or a reduction, said correction device controls a reduction or increase, respectively, within the limits of said corresponding thrust range, to correct the variation detected from certain of said parameters. Under these conditions, the throttle lever associated with said correction device performs the role of selector of modes of limiting thrusts and, within a mode, of means for modulating the level of the thrust.

On the other hand, in automatic operational mode, said throttle lever serves only as selector of limiting thrust mode, the modulation of the level of thrust being, in that case, obtained by the action of the electronic thrust-adjusting device. However, thrust modulation does not depend on the position of said lever, as was the case in the systems of the prior art.

Said correction device and said electronic thrust-adjusting device are preferably of the electronic computer type. They may be constituted by the same computer. If they are constituted by two separate computer units, it goes without saying that they are coupled so as to dialogue.

Said first, second and third means may be formed by circuits forming an integral part of said electronic computer. However, at least said first and second means may possibly constitute an input circuit for said electronic computer, which then incorporates said third means. In that case, said first means may be formed by threshold circuits, while said second means may be constituted by transfer circuits, each pair of a threshold circuit and a transfer circuit corresponding to a portion of the signal from the resolver, i.e. to a thrust range.

A mechanical device for marking the passage of the throttle lever from one zone to the other is advantageously associated with said throttle lever.

The mathematical function whereby a thrust for the engine corresponds to each position of the throttle lever, may be constituted by rectilinear portions. When the throttle lever moves from the position corresponding to the maximum thrust possible for the engine up to the position corresponding to the thrust corresponding to idling, it comprises at least two different portions, of which, one corresponds to a thrust range intended for take-off and the other to a thrust range intended for cruising speed. The portion corresponding to take-off concerns the highest thrusts and presents a gradient less than that of the portion relative to cruising speed. Said portion corresponding to take-off may itself be subdivided into two distinct thrust ranges, of which the higher one corresponds to take-off under full load and the other to take-off under reduced load or to the maximum thrusts capable of being exerted continuously.

When a thrust reverser is associated with said engine, in known manner, said law may further comprise a portion specific to the blowing of said reverser in active position and corresponding to a zone of thrust reversal. This specific portion is preferably disposed, with respect to the thrust corresponding to idling, on the side opposite said portions corresponding to take-off and to cruising speed and its gradient is of sign opposite that of said portions, with the result that, in the thrust range to which it corresponds, the thrusts increase when the throttle lever moves away from said idling thrust, i.e. when this lever moves beyond said idling in the same direction as that for which, this side of said idling, it passes with decreasing thrust from maximum thrust to idling.

In that case, it is advantageous to provide, for said law, an idling portion, the passage in thrust reversal being effected within said idling portion. A retractable stop is preferably associated with said throttle lever on which it is necessary to act voluntarily in order to be able to go beyond said idling portion in the direction of the thrust reversal portion.

On the other hand, said retractable stop is provided in order not to oppose the overstepping, by the lever, of said idling portion, from the thrust reversal portion in the direction of the cruising speed portion.

In order to be able to adjust the take-off thrust under reduced load with precision (in order to save fuel), after having brought said throttle lever into the corresponding zone, adjusting means are advantageously provided, which are capable of modifying the parameter of ambient temperature on the ground. In fact, it is known that the thrust upon take-off must be the greater as the ground temperature is higher, and vice versa. Consequently, by voluntarily reducing the parameter of ambient temperature, it is as if there were a reduction in load of the aircraft, while, by increasing this parameter, everything occurs as if said load were higher.

Although only on engine controlled by the system according to the invention has been provided hereinabove and hereinafter, it goes without saying that said system may be provided for monitoring the supply of a plurality of engines.

BRIEF DESCRIPTION OF THE DRAWINGS

The invention will be more readily understood on reading the following description with reference to the accompanying drawings, in which:

FIG. 1 schematically illustrates a known system for supplying fuel to an aircraft engine.

FIG. 2 schematically illustrates an embodiment of the system according to the invention for supplying fuel to an aircraft engine.

FIG. 5 shows the valve control signal and the thrust of the engine as a function of said stroke.

FIG. 6 shows the diagram of an embodiment of an input circuit for the electronic computer controlling the valve.

DETAILED DESCRIPTION OF THE INVENTION

Figure 3:
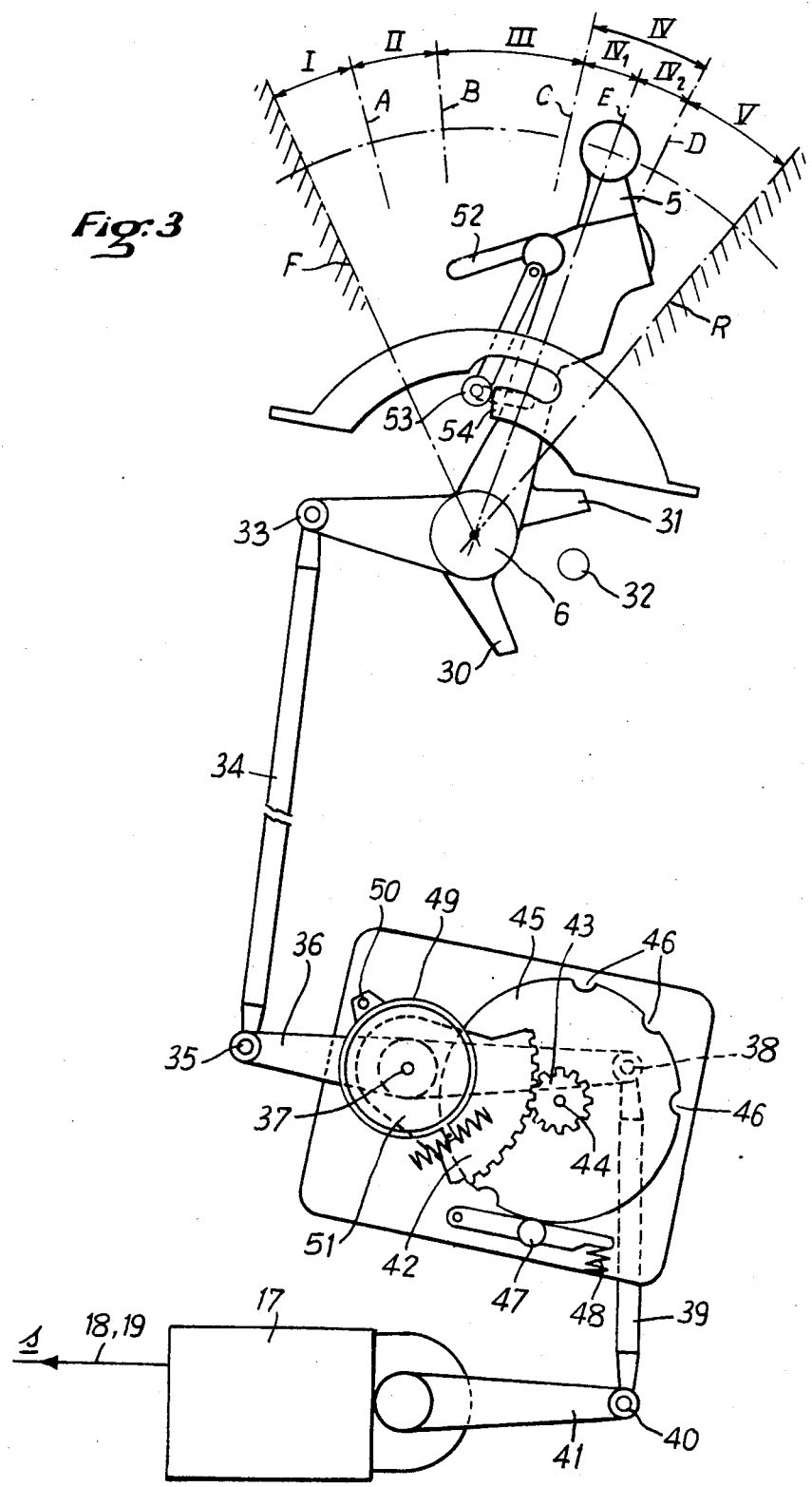
FIG. 3 shows an embodiment of the throttle lever/resolver assembly of the system of FIG. 2.

Referring now to the drawings, the system 1 of known type, illustrated by the block diagram of FIG. 1, is intended to supply fuel to an engine 2, for example a turbo-jet engine of an aircraft. The fuel, contained in a tank (not shown), is conducted to the engine 2 via a conduit 3, in which is mounted a controllable valve 4, monitoring the rate of flow of the fuel supplied to said engine 2.

This known system 1 comprises a throttle lever 5 capable of pivoting about a fixed axis 6, which is illustrated by double arrow 7. In FIG. 1, it has been assumed that the fixed axis 6 were at right angles to the plane of the drawing; in an aircraft, said fixed axis 6 is usually transverse, i.e. at right angles to the longitudinal axis of the aircraft.

The throttle lever 5 is connected to the controllable valve 4 via a transmission comprising a mechanical link 8 and a regulator 9. The mechanical link 8 passes via said regulator 9 so that the control order represented by a displacement of the lever 5 can be corrected as a function of the real possibilities of operation of the engine 2. To this end, the regulator 9 which conventionally comprises a hydromechanical regulator and an electronic supervisor, receives from detectors (not shown), on the one hand, via lines 10, a plurality of internal parameters of the engine 2, such as temperatures of the gaseous flows and of the blades of the turbines, gaseous pressures, speeds of rotation of rotors, etc... and, on the other hand, via lines 11, a plurality of parameters outside the engine 2, such as, for example, hygrometry of the air, ground temperature, speed of the air around the aircraft, relative speed of the aircraft with respect to the air, acceleration of the aircraft, etc...

It will therefore be easily understood that the pilot (or copilot) of the aircraft, by pivoting the throttle lever 5 about its axis 6 (arrow 7), thanks to the mechanical link 8, opens valve 4 more or less and therefore controls the speed of the engine 2. Such a direct manual actuation causes a certain fuel supply of the engine to correspond to a position of the throttle lever 5, with, however, a weighting introduced by the regulator 9, as a function of the value of the internal and external parameters received via lines 10 and 11.

Furthermore, the known system of the Figure comprises a selector 12 selecting modes of operation for engine 2, at least for certain control phases of the aircraft, as well as an electronic automatic thrust adjusting device 13 in connection with said selector 12. The device 13 may dialogue with the regulator 9 via a line 14 and, in particular, receives therefrom the internal and external parameters of engine 2, conveyed via lines 10 and 11. As a function of the information received from lines 10 and 11, on the one hand, and from the mode selector 12, on the other hand, the device 13 determines an instantaneous reference thrust for said engine. This reference thrust appears on a line 15 connected to the throttle lever 5 via a motorization device 16 (for example a jack). A resolver 17, rigidly connected to the throttle lever 5, delivers a signal indicative of the position of said lever 5, this signal being addressed to the regulator 9 and to the device 13, via lines 18 and 19 respectively.

The electronic device 13 is switched on or off by a switch 20. Another switch 21, borne by the throttle lever 5, possibly switches off the electronic device 13 in priority, in the event of an emergency.

As is known, the selector 12 makes it possible to select different modes for automatic operation of engine 2. For example, selector 12 makes it possible:

either to adjust the thrust of the engine 2 continuously in order to maintain the speed of the aircraft constant;

to control the thrust of engine 2 by a limiting value;

or to reduce the speed of engine 2 during the phases of descent or change of altitude of the aircraft; etc. . .

In this way, when the pilot or copilot serving the known system 1 wishes to pass from the manual control described hereinabove to automatic control via the selector 12, he acts on switch 20, after having selected an automatic operational mode on said selector 12. The electronic device 13 emits at its output 15 a signal which controls the motorization device 16; the latter correspondingly acts on the throttle lever 5, through the resolver 17, to cause it pivot it in appropriate manner. Such pivoting of the throttle lever 5 then controls the valve 4, via the mechanical link 8 and the regulator 9.

In automatic control, the electronic device 13 therefore replaces the pilot's or copilot's hand to displace the throttle lever 5 and act on valve 4.

When it is desired to pass from automatic control to manual control, it suffices to actuate switch 20 or, in the event of an emergency, switch 21.

In the known system of FIG. 1, not only can the correction introduced by the regulator 9 be effected only in the sense of closure of the valve 4, but the automatic control systematically passes through the position of the throttle lever 5, this necessitating the motorization 16. Moreover, a selector selecting the operational modes of the engine must be provided which is independent of the normal control of the gas.

As shown schematically in FIG. 2, the present invention enables these drawbacks to be overcome.

Elements 2 to 7, 10, 11, 13, 14 and 17 to 21 are found again in the schematic embodiment 22 of the invention shown in this FIG. 2. On the other hand, the mechanical link 8 has been eliminated and the regulator 9 replaced by an electronic computer 23. Similarly, the operational mode selector 12 has been eliminated, as well as output 15 and motorization 16.

The electronic computer 23 receives the different parameters conveyed via lines 10 and 11, as well as the output signal from resolver 17 via line 18 and dialogues via line 14 with the automatic thrust-adjusting device 13, which is in that case advantageously in the form of an electronic computer. Moreover, the electronic computer 23 is capable of controlling valve 4 thanks to the electrical link 24.

At each instant, the computer 23 knows the position of the throttle lever 5, thanks to resolver 17 and to link 18 and it may consequently control valve 4.

In manual operational mode, valve 4 is controlled from throttle lever 5 via resolver 17, link 18, computer 23 and link 24.

On the other hand, in automatic thrust-adjusting operational mode, valve 4 is controlled, upon request of computer 13 through link 14, by computer 23 via link 24. Motorization 16 is thus avoided.

Furthermore, according to the invention, as will be readily understood in the following specification, by continuously reading the position of the throttle lever 5, the computer 23 may:

select the limiting thrust mode;
activate the function of automatic thrust adjustment.

In fact, according to the invention, selection of the limiting thrust modes is effected by computer 23 from the continuous reading of the signal from resolver 17, i.e. from the position of throttle lever 5. Computer 23 identifies a position interval in which said lever 5 is located, selects a limiting thrust mode associated therewith and either directly modulates the real thrust of the engine within said mode, or addresses the latter to automatic thrust-adjusting computer 13, in the event of said position corresponding to a possible zone of automatic operation and of switches 20 and 21 being in the appropriate position.

When, as is conventional, engine 2 is associated with a thrust reverser 25 actuated by a control 26, an activation line 28 and an activation-confirming line 27 are provided between control 26 and computer 23 (cf. FIG. 2).

According to an important feature of the present invention, the stroke of throttle lever 5 about its pivot axis 6 is subdivided, materially or at least fictitiously, into a plurality of zones to each of which computer 23 causes a function representing the thrust of engine 2 as a function of the position of throttle lever 5, to correspond.

In the embodiment of FIG. 3, throttle lever 5 comprises two stops 30 and 31, capable of cooperating with a fixed catch 32: when lever 5 is pushed to a maximum forwardly of the aircraft, it occupies its extreme front position F delimited by the cooperation of stop 30 with fixed catch 32, whilst, when said lever 5 is pulled to a maximum rearwardly of the aircraft, it occupies its extreme rear position R delimited by the cooperation of stop 31 with said catch 32.

Lever 5 is articulated at 33 on a connecting rod 34, itself articulated at 35 on a lever 36 capable of pivoting about a fixed axis 37. At its free end 38, lever 36 is articulated on a connecting rod 39, articulated at 40 on the control member 41 of the resolver 17.

Furthermore, lever 36 is fast in rotation about the fixed axis 37 of a toothed sector 42, meshing with a pinion 43, capable of rotating about a fixed axis 44. On the fixed axis 44 is fixed a disc 45 comprising notches 46 on its periphery. A mobile catch 47 is pressed by a spring 48 against the periphery of the disc 45, with the result that, upon passage of a notch 46, there results a slight rough point.

In this way, thanks to the cooperation of notches 46 and mobile catch 47, the stroke of throttle lever 5 between its extreme positions F and R may be subdivided into consecutive zones I, II, III, IV and V, each of limiting positions A, B, C and D between said zones being determined by a notch 46.

In order to produce a sensation of effort in the course of actuating throttle valve 5, a clamp 49 may be provided, anchored at a fixed point 50 and tightening on a cylindrical boss 51 fast in rotation with lever 36 and coaxial to axis 37.

Throttle lever 5 bears, in addition, a safety trigger 52 fast with a catch 53, capable of coming into abutment against a fixed stop 54, subdividing zone IV into two zones IV1 and IV2, when the lever occupies a position E in its stroke from position F towards position R. A voluntary action on trigger 52, for example a lifting action, makes it possible to avoid the fixed stop 54 and to continue the stroke of the throttle lever 5 in the direction of position R. On the other hand, from position R towards position F, catch 53 spontaneously escapes the fixed stop 54.

Figure 4:
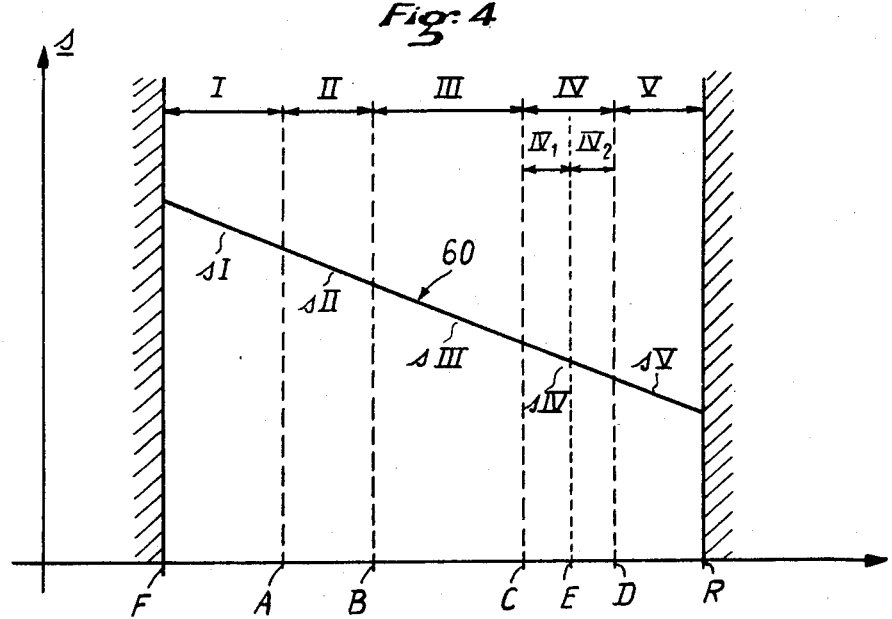
FIGS. 4 and 5 schematically illustrate the operation of the system according to the invention, FIG. 4 showing the signal from the resolver as a function of the stroke of the throttle lever, whilst

FIG. 4 shows, as a function of the position of throttle lever 5 along its stroke F-R, the curve 60 representing the variation of the electrical signal s appearing at output 18, 19 of resolver 17. This signal s is for example a linear function of the position of throttle lever 5 and a portion sI to sV of signal s corresponds to each zone I to V of the stroke of said lever.

Figure 5:
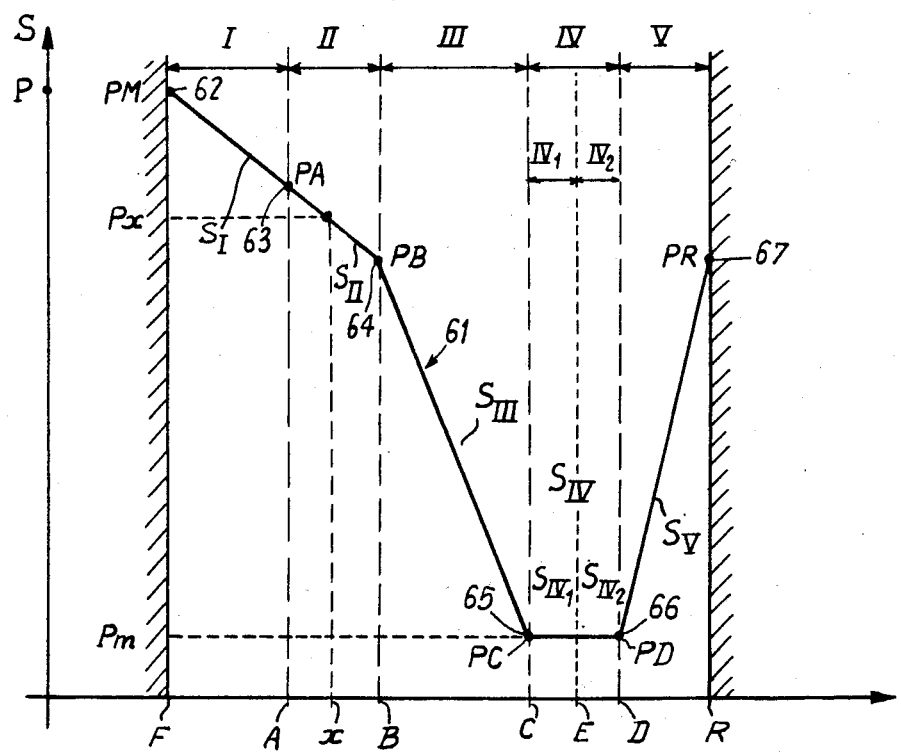

Signal s is transmitted to computer 23 which detects the passages A to D between portions sI to sV and converts the signal s into signal S represented by curve 61 in FIG. 5, as a function of the position of throttle lever 5.

As may be seen, the signal S generated by computer 23 is for example constituted by portions of successive straight lines SI, SII, SIII, SIV and SV, of different gradients, of which each corresponds to a section sI to sV of signal s. Of the signal S shown by curve 61 of FIG. 5:

rectilinear portions SI and SII, separated by position A, are substantially aligned and present a negative gradient of the order of 45°;

portion SIII, separated from portion SII by position B, presents a negative gradient which is more marked than that of portions SI and SII;

portion SIV separated from portion SIII by position C, constitutes a level and is subdivided into two portions SIV1 and SIV2 by position E;

portion SV follows portion SIV, beyond position D and presents a marked positive gradient.

Computer 23 controls valve 4 via electric link 24, so that the opening of said valve is proportional to the amplitude of signal S, i.e. to the amplitude of each elementary signal SI to SV; it is thus seen that the thrust P of engine 2, from position F towards position R, decreases from maximum value PM (for position F) to the minimum value Pm (between C and D), via successively decreasing intermediate values PA and PB (respectively at A and B), then increases from minimum value Pm (for position D) to value PR (for position R).

In this way, a thrust range: PM-PA, PA-PB, PB-PC, PC-PD and PD-PR for engine 2 is associated with each zone I to V of the stroke of throttle lever 5.

In manual operational mode of the system according to the invention, the pilot (or copilot) brings throttle lever 5 into one of zones I to V, in position x (cf. FIG. 5). This therefore results in a thrust Px for engine 2. As a function of the value of parameters received by lines 10 and 11, computer 23 will vary the control of engine 2 within the corresponding thrust range (zone III in the example of FIG. 5), between the maximum and minimum thrusts of said range (PB and PC in said example), in order to maintain the thrust Px manually displayed.

Thanks to the invention, the thrust of engine 2 therefore undergoes not only a regulation, but a veritable modulation between two limiting thrusts selected as a function of a position to which throttle lever 5 is brought.

Consequently, when throttle lever 5 is brought manually into:

zone I, the thrust exerted by engine 2 is the greatest possible and is automatically modulated between the maximum value PM and value PA; this zone is used for example for take-offs under full load or during a go-around;

zone II, said thrust remains important and is automatically modulated between values PA and PB; this zone is used for example for take-offs under reduced load (fuel saving) or when an engine must function continuously at high thrust, for example to compensate the breakdown of another engine;

zone III, said thrust may be largely modulated between thrust PB and the minimum (or idling) thrust Pm; this zone is particularly intended for cruising speed;

zone IV1, engine 2 exerts its minimum forward thrust Pm, whatever the position of the throttle lever 5 in this zone;

zone IV2, engine 2 exerts its minimum reverse thrust Pm, whatever the position of the throttle lever 5 in this zone; and zone V, the thrust is largely modulatable between the minimum reverse thrust Pm and the maximum reverse thrust PR; this zone is used for the blowing of the thrust reverser 26.

In level IV, the passage from zone IV1 to zone IV2 (i.e. from direct, thrust towards reverse thrust) can only be effected by voluntary actuation of the retractable stop 53, when the throttle lever 5 attains position E.

It is therefore seen that, by action of electronic computer 23, manual operation of the system according to the invention is considerably automatized.

Automatic operational mode of the system according to the invention is provided only for certain zones, for example cruising speed zone III. In that case, when electronic computer 23 detects both that throttle lever 5 is in zone III and that the system of switches 20, 21 is in the adequate position, it controls electronic computer 13 for the latter to control valve 4, via it and the electrical link 24. Computer 13 thus enables the thrust of engine 2 and/or the speed of the aircraft to be controlled by all target values (included in the range PB-Pm but independently of the position of the throttle lever 5 in zone III) or by all preprogrammed variations of target value.

As seen hereinabove, electronic computer 23 performs, in manual operational mode, three functions:

it subdivides signal s from said resolver 17 into a plurality of consecutive portions sI, sII, sIII, sIV and sV;

it converts each of said portions sI to sV of signal s from resolver 17 into an elementary valve control signal SI, SII, SIII, SIV or SV respectively, which is characteristic of a control phase of said aircraft and of which the ends 62 and 63, 63 and 64, 64 and 65, 65 and 66, 66 and 67, except possibly for that SIV of said elementary valve control signals which corresponds to idling of engine 2, constitute, one, the maximum value and the other, the minimum value of said corresponding elementary signal, the output signal s of said correction device 23 being constituted by the juxtaposition of said elementary valve control signals, with the result that:

on the one hand, a law 61 is established which causes a thrust P for engine 2 to correspond to each position of the throttle lever 5; and on the other hand, the stroke F-R of said throttle lever is subdivided into a plurality of consecutive zones I to V of which each is associated with a control phase and corresponds to a thrust range (PM-PA, PA-PB, PB-PC, PC-PD, PD-PR) for said engine 2, the ends F, A, B, C, D and R of each zone corresponding, one, to the maximum value and the other, to the minimum value of the thrust P in the corresponding range;

when the electronic thrust-adjusting device 13 is switched off by action of said switching means 20, 21, and when said throttle lever 5 lies within such a zone I to V and as a function of said parameters 10, 11, it varies the thrust P within the corresponding range, the variation in thrust being effected from the value Px corresponding to the position x of the throttle lever 5, both towards the maximum value and towards the minimum value of said range, said maximum and minimum values then constituting limits not to be overstepped. These functions may be obtained by programmation. They may also be at least partly performed by circuits associated with said electronic computer 23. For example, FIG. 6 shows an input circuit 70 capable of performing the first two functions mentioned hereinabove.

The input circuit 70 comprises six threshold circuits 71 to 76, each capable of detecting a portion sI, sII, sIII, sIV1, sIV2 or sV of the signal s from resolver 17, by comparing its threshold values with the amplitude of signal s at the ends of the corresponding portion, as well as six transfer circuits 81 to 86 capable, from each of said portions of signal s, of generating portions SI, SII, SIII, SIV1, SIV2 and SV respectively of signal S. Signal S is addressed to the electronic computer 23 via line 87. Said computer addresses to input circuit 70, via link 88, a signal confirming idling of engine 2. Moreover, input circuit 70 receives the signals conveyed by lines 28 and 27, respectively indicative of the control and state of the reverser 25.

As mentioned hereinabove, in the event of takeoff under reduced load, the throttle lever 5 is placed in zone II, corresponding to a range of high thrusts PA-PB, but lower than those of zone I. In this way, there is a saving of fuel.

In order to perfect adjustment of the thrust of engine 2 with respect to the load of the aircraft upon take-off, an adjusting device 89 may be provided, interposed on external parameter line 11 corresponding to the parameter of ambient temperature. In this way, by voluntarily modifying this ambient temperature, the thrust of engine 2 is varied.

By establishing a correlation between the ambient temperature and the value of the load upon take-off, said value is thus automatically introduced into the parameters taken into account by electronic computer 23.

What is claimed is:

1. In a system for supplying fuel to an aircraft engine, of the type comprising:
   a controlled valve, controlling the flowrate of fuel admitted into said engine;
   a throttle lever, mobile in two opposite directions in a stroke defined by two end positions, said lever being associated with a resolver capable of delivering a continuous signal indicative of the position of said lever;
   a transmission arranged between said throttle lever and said controlled valve, to cause one position of said valve to correspond to one position of said lever, said transmission comprising a correction device which, on the one hand, receives a plurality of parameters concerning both the operation of the engine and the environment of said aircraft, as well as the signal from the resolver, and, on the other hand, is capable of correcting the control of said valve by said lever to take into account said parameters;
   an electronic thrust-adjusting device receiving at least certain of said parameters and the signal from the resolver, and delivering a signal indicative of a reference thrust; and
   switching means enabling said controlled valve to be controlled:
      either by voluntary manual actuation of said throttle lever,
      or, at least at cruising speed of the aircraft, automatically via said electronic thrust-adjusting device,
   said correction device is entirely electrical and controls said valve via its output signal;
   the electrical connection between said resolver and said correction device is the sole link between said throttle lever and said correction device;
   said correction device comprises:
      first means for subdividing the signal from said resolver into a plurality of consecutive portions;
      second means for converting each of said portions of signal from the resolver into an elementary valve-control signal, which is characteristic of a control phase of said aircraft and whose ends, except possibly for that elementary valve-control signal which corresponds to idling of the engine, constitute, one, the maximum value and the other, the minimum value of said corresponding elementary signal, the output signal of said correction device being constituted by the juxtaposition of said elementary valve-control signals, with the result that,
   on the one hand, there is established a mathematical function which ensures that a thrust for the motor corresponds to each position of the throttle lever, and
   on the other hand, the stroke of said throttle lever is subdivided into a plurality of consecutive zones of which each is associated with a control phase, and corresponds to a thrust range for said engine, the ends of each zone corresponding, one, to the maximum value and the other, to the minimum value of the thrust in the corresponding range; and
   third means which, when the electronic thrust-adjusting device is switched off by action of said switching means, and when said throttle lever lies within such a zone and as a function of said parameters, automatically cause the thrust to vary within the corresponding range, the variation in thrust being effected, from the value corresponding to the position of the throttle lever, both towards said maximum value and towards the minimum value of said range, said maximum and minimum values constituting limits not to be overstepped.

2. The system of claim 1,
wherein said correction device comprises an electronic computer.

3. The system of claim 1,
wherein said electronic thrust-adjusting device comprises an electronic computer.

4. The system of claim 2,
wherein said first, second and third means are formed by circuits forming an integral part of said electronic computer.

5. The system of claim 2,
wherein said first and second means constitute an input circuit for said electronic computer which incorporates said third means.

6. The system of claim 5,
wherein said first means are formed by threshold circuits;
said second means are constituted by transfer circuits,
each pair of a threshold circuit and a transfer circuit corresponds to a portion of the signal from the resolver.

7. The system of claim 1,
wherein there is associated with the throttle lever a mechanical device for marking the passage of said lever from on zone to the other.

8. The system of claim 1,
wherein the mathematical function whereby a thrust for the engine corresponds to each position of the throttle lever, is constituted by rectilinear portions.

9. The system of claim 1,
wherein the mathematical function whereby a thrust for the engine corresponds to each position of the throttle lever, comprises, when the lever moves from the position corresponding to maximum thrust to the position corresponding to minimum idling thrust, at least two different portions of which one corresponds to a thrust range intended for take-off and the other to a thrust range intended for cruising speed.

10. The system of claim 9,
wherein said portion corresponding to take-off concerns the highest thrusts and presents a gradient less than that of the portion relative to the cruising speed.

11. The system of claim 9, wherein said portion corresponding to take-off is subdivided into two distinct thrust ranges, of which the higher one corresponds to take-off under full load and the other to take-off under reduced load and to the maximum thrusts capable of being exerted continuously.

12. The system of claim 1 in which a thrust reverser is associated with said engine, wherein the mathematical function whereby a thrust for the engine corresponds to each position of the throttle lever, comprises a portion which is specific to the blowing of said reverse in active position.

13. The system of claim 12, wherein said thrust reversal portion is disposed, with respect to the thrust corresponding to idling of the engine, on the side opposite said portions corresponding to take-off and to cruising speed, and its gradient is of sign opposite those of these latter portions.

14. The system of claim 13, wherein said mathematical function whereby a thrust for the engine corresponds to each portion of the throttle lever, comprises a portion corresponding to idling of said engine, and the passage to thrust reversal is effected within said idling portion.

15. The system of claim 12, wherein there is associated with said throttle lever a retractable stop on which it is necessary to act voluntarily in order to be able to overstep said idling portion in the direction of said thrust reversal portion.

16. The system of claim 1 in which one of the parameters external to the engine taken into account is the ambient temperature on the ground, wherein said parameter comprises adjusting means for modifying said ambient temperature parameter in order to adjust the thrust of the engine in the case of take-off under reduced load.

* * * * *